United States Patent [19]

Humphrey

[11] 3,939,327
[45] Feb. 17, 1976

[54] OPTICAL READING APPARATUS AND METHOD

[75] Inventor: John H. Humphrey, Los Angeles, Calif.

[73] Assignee: Data Source Corporation, El Segundo, Calif.

[22] Filed: Apr. 5, 1972

[21] Appl. No.: 241,180

Related U.S. Application Data

[63] Continuation-in-part of Ser. No. 848,769, Aug. 5, 1969, abandoned.

[52] U.S. Cl. .... 235/61.11 E; 250/567; 340/146.3 F
[51] Int. Cl.².... G06K 7/10; G08C 9/06; G06K 9/00
[58] Field of Search... 340/146.3 F, 146.3 Z, 146.3 A, 340/146.3 C; 235/61.11 E; 250/555, 566, 567

[56] References Cited
UNITED STATES PATENTS

| | | | |
|---|---|---|---|
| 2,294,679 | 9/1942 | Maul | 340/146.3 Z |
| 2,723,308 | 11/1955 | Vroom | 340/146.3 Z |
| 3,299,298 | 1/1967 | Schinner | 340/149 |
| 3,485,168 | 12/1969 | Martinson | 340/146.3 A |
| 3,612,833 | 10/1971 | Davis | 235/61.11 C |

*Primary Examiner*—Daryl W. Cook
*Attorney, Agent, or Firm*—Seidel, Gonda & Goldhammer

[57] ABSTRACT

Apparatus for recognizing alpha-numeric indicia that are either printed or embossed such as are common to credit cards and other identification means for use in a data processing system. The optical reading apparatus scans a surface to be read using a read head that conducts light to and from the surface using light conducting rods. Photosensors at the emitting ends of light conducting rods detect changes in the level of light reflected from the surface. For recognizing indicia, the level of light is made to be directly related to particular portions of the alpha-numeric indicia being read. The entrance ends of the light conducting rods are strategically placed so that logic circuitry connected to the photosensors can convert the detected signal into machine language.

36 Claims, 12 Drawing Figures

OPTICAL READING APPARATUS AND METHOD

This application is a continuation-in-part of patent application Ser. No. 848,769, filed Aug. 5, 1969, now abandoned.

This invention relates to an optical reading apparatus and method. More particularly, this invention relates to apparatus for optically reading alpha-numeric indicia such as normally appear on certain identification means such as credit cards, passbooks, product tags, labels and the like. The invention is particularly directed to reading embossed or debossed indicia, although it can be used to read printed indicia. The information which is read is converted into machine language and is used by a data processing system.

As the use of identification means, particularly credit cards, has grown, so have the problems involved in controlling their use. One of the most prevalent problems is unauthorized use of a credit card either by persons who have illegally obtained possession or by persons whose credit has been removed or severely reduced. At present, there is no accepted way for strictly checking credit cards and other identification means except to provide the merchant with long lists of lost, stolen or revoked credit cards. The merchant must then check the credit card or other identification means against the list prior to selling the goods or service on credit in lieu of cash. An alternative method is to require the merchant to telephone each credit card number that is presented into a central bureau which performs the checking operation. Both systems cause long delays and customer embarrassment, not to mention possible inaccuracies. Moreover, the maintenance of both systems is quite expensive.

The present invention is directed to an apparatus for use in a system for overcoming the foregoing problems and providing a new and unobvious device for reading indicia including embossed or debossed alpha-numeric indicia such as appear on credit cards and other forms of identification means. In accordance with the present invention, indicia are read by conducting light from a source to the surface bearing the embossed or debossed indicia by a light conducting rod. Light reflected from the surface is conducted to a photosensor by a second light conducting rod. The aforesaid first and second light conducting rods are arranged at the proper angle to the normal to the indicia bearing surface (angle of incidence and reflection) so that reflected light is transmitted to the photosensor when incident light from a source is cast upon the surface. However, the angle and size and position of the light conducting rod is such that when light from the source is incident upon an embossed or debossed portion of indicia, it is no longer reflected to the second rod and hence the photosensor produces a change in its output indicative of the absence of light.

Certain indicia, such as numerals, are made up of unique combinations of horizontal and vertical bars. Given the foregoing, it is possible to position a predetermined number of first and second light conducting rods such that each detects a particular portion of the indicia. In a preferred embodiment of the present invention there are a number of paired first and second light conducting rods. Certain ones of the photosensors necessarily must detect portions of the indicia in a predetermined sequence and combination. This output is applied from the photosensors to logic circuitry which generates a binary code indicative of particular indicium. This binary code can be interfaced with a central bank of stored data such as a memory storage device.

In operation there can be any number of stations with optical reading apparatus, each electronically connected to one or more central memory storage banks. The identification means is scanned and each indicium thereon is read and transmitted to the central memory storage bank. When all of the indicia has been transmitted to the memory, the information is electronically compared with stored information to determine whether the identification means so read is acceptable or not. The results of this comparison is transmitted back to the scanner station so that the user knows whether to accept or reject the identification means as presented.

Thus, in accordance with the present invention, there is provided a device for optically scanning and reading indicia such as are found on a credit card. The indicia so read are converted into a binary code which is interfaced with a memory storage bank. Each of the optical scanning devices may be adapted to be a remote terminal tied to a central computer over long distance telephone lines or other forms of communication. In operation, the user need only insert the credit card or other identification means into the reading device which initiates a scanning motor, and then wait to receive approval or disapproval of the credit card or the like.

Although the present application has particular reference to the reading and verifying of credit cards, those skilled in the art will readily recognize that it can be applied to other forms of identification means such as bank books, passbooks, passports, library cards and books, identification badges, product tags and labels and the like. The invention is particularly directed to credit cards because this is an area where acute processing problems have arisen.

Although the present invention is principally directed to optical reading apparatus for reading embossed indicia such as appears on credit cards, one of its more unique advantages is that it can also read flat print using identically the same read head. Thus, the read head designed in accordance with the principles described herein has the unique characteristic of being able to read both embossed characters or printed characters which are flush with the surface on which they are printed.

The ability to recognize printed (flat) characters as well as embossed characters (credit card type) greatly expands the uses to which the invention can be put. The ability to read flat print means that apparatus incorporating a read head such as described herein can be used to read tags attached to products. Such a device could be used by a salesman who desires to take inventory on the floor of a retail store or by a warehouseman or any business that desires to take inventory. Moreover, a proper code that can be read by a tag reader can provide accurate detailed information concerning the product which could only be gathered laboriously by human effort. Another possible use for the invention is at a check-out counter in a grocery store where both price and product identification information can be simultaneously gathered for inventory control purposes. Yet another use would be for reading transportation tickets such as air line tickets, for the rapid and more efficient handling of passengers.

There are many known types of devices for reading indicia and converting it into machine language for processing. Some devices read numerals printed with magnetic ink; others read magnetic tape; still others read pre-punched perforations such as appear on paper tape. Some of these devices are optical readers and still others are mechanical readers. Each reading device has certain advantages and disadvantages and each may or may not be adaptable to a system for verifying credit cards, provided the credit card industry was in its infancy and not committed to the current form of credit card using embossed indicia. Unfortunately, the industry is so committed and it will not willingly change the format of its cards. Accordingly, a means for reading the indicia on such cards as they presently exist must be used. For this reason, a new and unobvious optical reader for recognizing embossed or debossed indicia forms part of this invention.

The present invention, therefore, is directed to an optical read head for reading existing credit cards and the like which may be installed without modification by the issuers of such credit cards and persons who grant credit for the purchase of goods and services based on an identification made through the possession of such credit cards.

Another object of the present invention is to provide a system for using such optical readers in conjunction with a central storage bank of information capable of making comparisons for the purposes of verifying the credit card on a real time basis.

Another object of the present invention is to provide an optical read head which may be used to read embossed or debossed indicia by scanning the read head over the indicia.

For the purpose of illustrating the invention, there are shown in the drawings forms which are presently preferred; it being understood, however, that this invention is not limited to the precise arrangements and instrumentalities shown.

Figure 1:
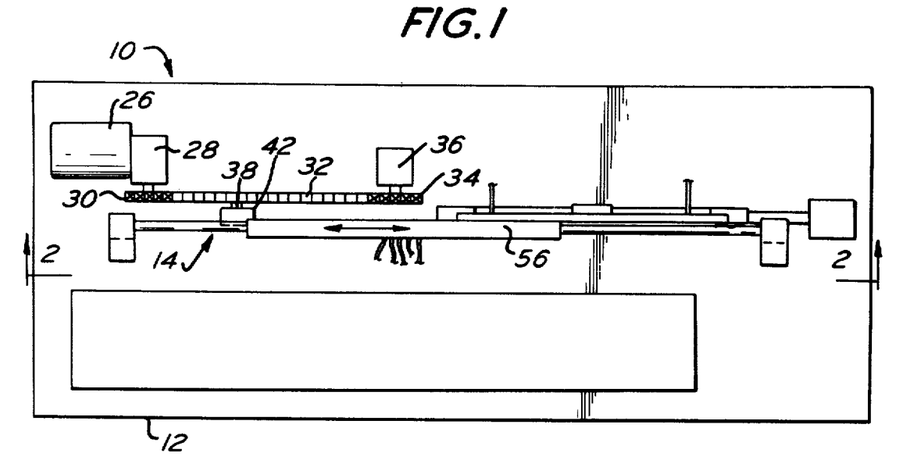
FIG. 1 is a top plan view of a scanning device and optical read head in accordance with the present invention.

Referring now to the drawings in detail, wherein like numerals indicate like elements, there is shown in FIG. 1 an apparatus for optically recognizing indicia designated generally as 10.

As shown, the optical reading apparatus includes a base 12 upon which is mounted a transport mechanism 14 for reciprocating a read head support 16 in linear, straight line movement past an indicia retaining mechanism 18 which holds in position for reading a credit card 20 or other identification means that bears the indicia to be read.

The purpose of the transport mechanism 14 is to provide relative movement between the read head 22 supported by the read head support mechanism 16 and the credit card 20 supported by the card retaining mechanism 18. It should be understood that as described herein such relative movement is provided by translating the read head support mechanism 16 relative to the fixed position card retaining mechanism 18. However, those skilled in the art will readily recognize that relative movement can be accomplished in other ways such as by translating the card retaining mechanism relative to a fixed read head or by simultaneously translating both the read head support mechanism 16 and the card retaining mechanism 18. The relative movement can be effected by motor or it can be manual.

The purpose of such relative movement is to bring each of the embossed numerals 24 into a prescribed alignment with a predetermined portion of the read head 22. In the preferred embodiment of the present invention, the embossed numerals are successively moved into alignment and position relative to particular area of the read head 22. Each numeral 24 (FIG. 5) is read successively in the order in which they appear on the card 20.

Although the present invention is described in connection with the reading of numerals 24, those skilled in the art will readily recognize that it may be equally used to read other indicia such as letters of the alphabet provided they fall within certain design constraints as described herein. In general, the present invention is intended to recognize numerals such as appear on credit cards, however it also has direct application to any alpha-numeric, or if desired, to other forms of predetermined indicia. The only requirement for such indicia or alpha-numerics is that a prescribed font be used. The reason for this appears below.

The transport mechanism 14 comprises a motor 26, gear box 28, sprocket wheel 30, chain 32, sprocket wheel 34, and bearing mount 36 for the sprocket wheel 34. The chain 32 is of the endless type and is driven by the motor 26 through the gear box 28. A pin 38 is fixed to one of the links of chain 32 and extends laterally outward therefrom. Pin 38 is slidingly engaged in a slot 40 in block 42 which is fixed to the read head support mechanism 16. The length of slot 40 is equal to the distance between the two flights of chain 32. As thus provided, chain 32 drives pin 38 which in turn drives block 42 and hence causes reciprocatory translation of the read head support mechanism 16. By positioning pin 38 in a slot 40, the effect on block 42 of pin 38 moving from the upper flight to the lower flight and vice versa as it passes around the sprocket wheels 30 and 34 is eliminated. Hence, the read head support mechanism 16 is caused to move in straight line, linear, reciprocatory movement.

Figure 11:
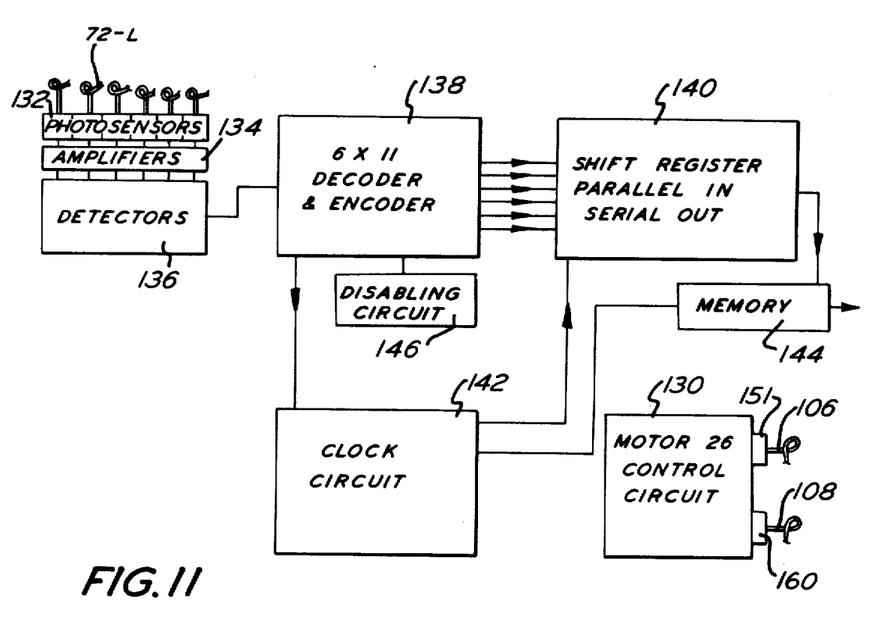
FIG. 11 is a block diagram of the read head terminal circuitry.

In a preferred operation of the present invention, the read head support mechanism makes only two passes over the card 20 and then stops. Appropriate electrical and electronic controls 130 for the motor 26 are provided for the purpose of causing it to stop after the read head support mechanism 16 has been translated from left to right and then back to the starting position as viewed in FIG. 2. This may be accomplished by any conventional control system 130, as shown in FIG. 11, which may include a start switch for the motor 26 and a sensing switch to detect the return of the read head support mechanism 16 to the starting position and stop the motor.

The foregoing transport mechanism 14 is exemplary of any number of transport mechanisms which may be used to effect the same translatory motion. For example, a linear electric motor with appropriate controls may be substituted for the illustrated transport mechanism 14.

The read head support mechanism 16 is guided for reciprocatory movement between supports 44 and 46 by a pair of guide rails 48 and 50 which are mounted to and extend between the supports 44 and 46. Rails 48 and 50 extend through guide holes 52 and 54 which have been drilled or otherwise formed in the frame 56. The diameter of holes 52 and 54 is chosen so that the frame 56 may freely slide on rails 48 and 50.

Although in the illustrated form of the invention the rails 48 and 50 are cylindrical rods extending through holes 52 and 54, those skilled in the art will readily recognize that other types of guide means and interconnections between such guide means in the frame 56 may be used. For example, a tongue and groove interconnection may be substituted.

Figures 4, 5:
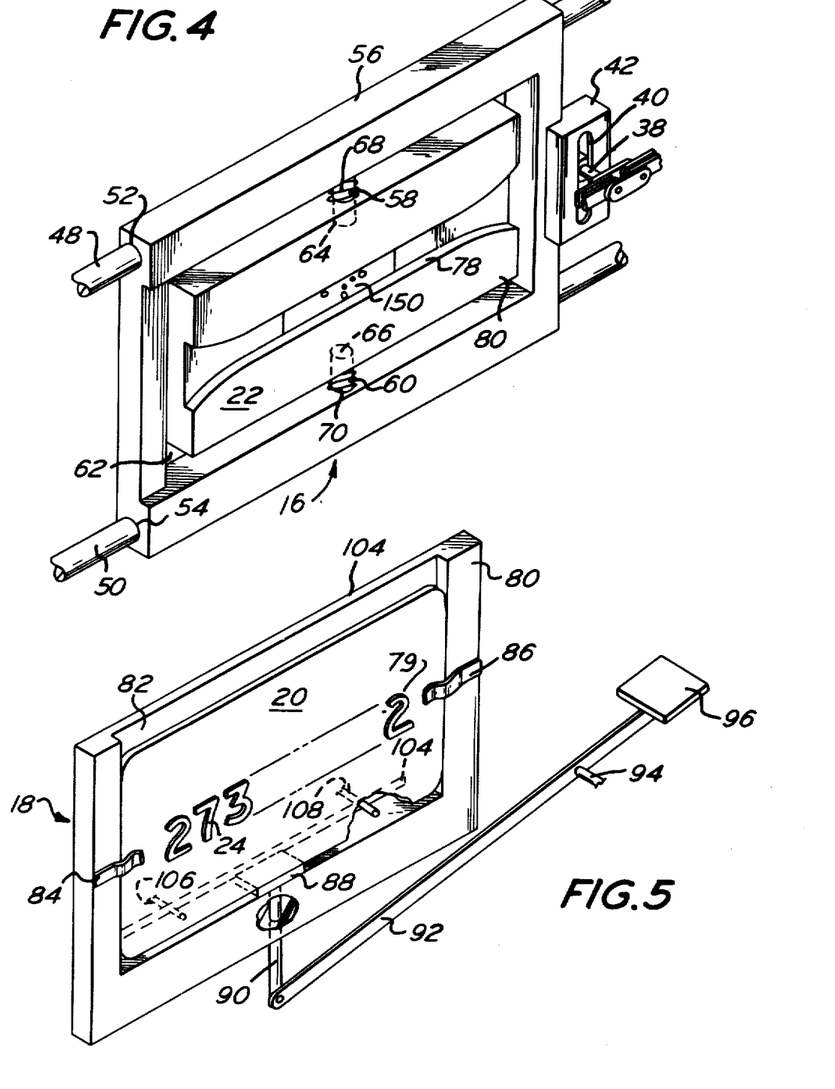
FIG. 4 is a perspective view of an optical read head and its support.
FIG. 5 is a perspective view of a holder for identification means such as a credit card.

As shown in FIG. 4, the read head 22 is pivotally supported on the frame 56 by a pair of pins 58 and 60 which extend from the upper and lower walls of the opening 62 in frame 56 into blind cavities 64 and 66 drilled or otherwise formed in the read head 22. The depth of cavities 64 and 66 is greater than the extension of pins 58 and 60 into them. Accordingly, the read head 22 is free to move to a limited extent along the longitudinal axis of the pins 58 and 60. The read head 22 is also free to rotate about the longitudinal axis of the pins 58 and 60. The read head 22 is caused to normally position itself intermediate the upper and lower walls of the opening 62 by springs 68 and 70 which extend around the pins 58 and 60 and provide opposing bias forces on the upper and lower edge surfaces of the read head 22. The length of the read head is shorter than the length of the elongated opening 62 by an amount sufficient to assure that it does not interfere with the side walls of the opening 62.

As thus mounted within the frame 56, the read head 22 has sufficient freedom of motion to properly align itself with the embossed numerals 24 on the card 20 in the event they are not accurately aligned in the first instance. The read head 22 is preferably made of a strong, wear resistant material such as stainless steel that can be polished smooth to freely slide on the surface of the credit card.

The read head 22 includes a guide 80 and read head insert 150. The read head insert 150 is preferably made of a socalled "self-lubricating" plastic material such as nylon, Teflon, or Kel-F. If desired, it could also be made of other forms of plastic materials or even other materials such as metal. The read head insert 150 is preferably made non-light reflecting by blackening its surface or making the insert from non-reflective material.

The read head insert 150 is held in position in guide 80 by means of leaf spring 152 fastened to the read head insert 150 by fasteners 153 and to guide 80 by fasteners 154. The spring 152 presses the contacting surface 155 of the read head insert 150 against the raised portions of the embossed numerals 24. However when no embossed character is in position the surface of the read head insert 150 is restrained away from the unembossed, flat card surface 79 by a distance slightly less than the height of the embossed characters by wedging bevelled surface 157 of read head insert 150 against the bevelled surface 156 of the guide 80. The surface 155 of read head insert 150 is flat in the area that contains holes 74 for light conducting rods 72 but it is curved at its ends in such a manner that it easily rides up onto embossed numerals 24 as it moves across the face of credit card 20.

The purpose of the read head insert 150 is to support a plurality of light conducting rods or fibers 72 in close juxtaposition to the numerals 24 on the card 20. These light conducting rods serve to conduct incident light from a light source to the surface of the card 20 and to conduct light reflected from said surface to a photosensors. The positioning of the ends of the light conducting rods relative to the characters together with a determination of the presence or absence or diminution of light results in the generation of sufficient information to read the particular number as is explained below.

The read head insert 150 supports the light conducting rods designated generally as 72 in holes 74 having a diameter approximately equal to the outside diameter of the light conducting rods 72. The holes 74 are at a bias through the central portion of read head insert 150. The light conducting rods 72 are individually inserted in the holes 74 and their ends are polished flush with the surface 155 of the read head insert 150. As thus positioned, the light conducting rods 72 transmit and receive light through their end surfaces to and from the surface of card 20.

A guide recess 78 in guide 80 has a depth slightly greater than the height of the numerals 24 embossed on the surface of card 20. The reason for this is explained below. Guide recess 78 has a width through its central portion which equals the height of the widest part of the base of each of the numerals 24 on the card 20. The ends of the recess 78 are flared to a greater width so that the read head is self-aligning when it engages the first numeral 24 on the card 20. This self-aligning or automatic aligning feature provides sufficient flexibility so that each card does not have to be perfectly aligned in the credit card retaining mechanism. Additionally, the surface of guide 80 presses against the credit card 20 and holds it flat. The read head 22 is free to move vertically within opening 62 in frame 56. Moreover, it is free to rotate about pins 58 and 60 so as to bring the read head insert 150 into alignment with the characters on the credit card. The read head insert 150 is also free to move toward and away from the characters 24 under the biasing force of spring 152.

From the foregoing, it should be apparent that the read head 22 can obtain the necessary vertical alignment of the light conducting rods 72 with the characters to be read by guiding on the embossed characters themselves as the head scans across the credit card. In other words, the read head accommodates itself to the embossed characters independent of where the characters are physically located on the credit card, within a specified range. Thus, there is no need to guide on the edge of the card. Furthermore, the system will accommodate cards having embossing spaced differently with respect to the edge of the credit cards. Therefore, the mechanism provides the necessary accurate vertical alignment so that the characters can be correctly read.

To permit the most accurate reading of characters, the read head 150 should ride on top of the characters thereby optimizing occlusion, with all light being theoretically blocked from entrace into a light conducting rod connected to a photosensor as explained below. However, embossing height varies within a range from card to card due to manufacturing variances as well as wear. Therefore, the read head insert 150 is permitted to move toward and away from the credit card (perpendicular to the card) during scanning. Thus, it is possible for the read head to move outwardly from the credit card to accommodate higher embossing and likewise to move toward the credit card to accommodate embossing having a lower height. However, the read head always rides a minimum predetermined distance from the flat surface of the credit card so that characters still can be read even if the embossing is worn lower than this predetermined distance.

As indicated above, the card 20 is retained in position within the mechanism 10 by a card retaining mechanism 18. As shown in FIG. 5, card retaining mechanism 18 includes a frame 80 within which is formed a three sided recess 82 for receiving the card 20. Recess 82 also generally guides the card 20 into position for cooperation with the read head 22 during the scanning operation and serves as a back support. Thus, the card 20 may be inserted through a slot in a housing (not shown) surrounding the machine and guided into position by the recess 82 in frame 80. The card 20 is generally held in position within the recess 82 by a pair of leaf springs 84 and 86 which normally bias the card against the back wall 104 of recess 82.

When fully inserted in the frame 80, the card 20 rests against a pad 88 which defines the terminus of an ejection mechanism. The pad 88 is fixed to a rod 90 which extends through a hole in the bottom leg of the frame 80 and is pivotally connected to a lever 92. The lever 92 pivots about a hinge pin 94 which is supported by support 46. By manually depressing the handle 96 fixed to the end of the lever 92, the rod 90 is caused to move upwardly into the area defined by frame 80 and recess 82 and therefore bias the pad 88 against the bottom surface of card 20. As a result thereof, the card 20 is displaced from the recess 82 by an amount sufficient to permit it to be completely pulled out.

In the operation of the optical reading apparatus 10, it is anticipated that the lever 92 will be manually operated by depressing the handle 96 only in the event that the apparatus should fail to operate properly or in the further event that the card cannot be verified. Normally, the card is automatically ejected by activating a solenoid 98 which retracts actuator rod 100 to thereby pivot the lever 92 about the hinge pin 94. Energization of the solenoid 98 may be effected by engagement of the frame 56 against a switch 102 positioned on the support 44 during its return stroke following a scan. Switch 102 may also be used to disconnect the motor 26 through appropriate circuitry 130.

The foregoing described card retaining mechanism 18 should be considered as exemplary. Those skilled in the art will readily recognize that other apparatus for supporting the card 20 may be provided including alternative means for ejecting or otherwise removing the card 20 from such apparatus.

The back wall 104 of frame 80 is provided with a pair of holes into which light conducting rods 106 and 108 are inserted. Rods 106 and 108 are positioned adjacent the bottom wall of recess 82. Light conducting rods 106 and 108 are connected to photosensors 151 and 160 which in turn are connected to switching circuitry 130 for initiating the operation of motor 26. In the absence of a card 20 fully positioned in the recess 82, the light conducting rods 106 and 108 conduct light to the photosensors which generate a signal voltage that is used to hold the switching circuitry for motor 26 in an off condition. When the card 20 is fully inserted in the recess, and is generally properly aligned so that the numerals 24 extend in a position parallel to the bottom wall, as determined by the fact that the card covers the terminal surfaces of both rods 106 and 108, the light is blocked from entering the light conducting rods. This provides a sufficient change in the output of the photosensors to signal the switching circuitry to initiate the operation of motor 26. Motor 26 thereafter drives the frame 56 and hence the read head 22 through a scanning operation over the numerals 24 on card 20. The switching circuitry is designed so that the scanning operation is performed by the read head 22 only when both light conducting rods 106 and 108 are covered by the card 20. Appropriate lighting means, such as neon lamps, are mounted in a position opposite the terminal faces of the light conducting rods 106 and 108.

The foregoing describes the apparatus for causing the read head 22 to scan the numerals 24. Referring now to FIGS. 6, 7, 8, 9 and 10, there is illustrated in detail the manner in which the numerals on the card 20 are read by the scanning operation.

As indicated above, the present invention requires that the font of indicia be fixed. Thus, the ability to generate information sufficient to read the presence of a particular indicia depends upon the structure of such indicia relative to the position of the several light conducting rods at a particular instance of time during the scanning operation. The form of the font, within reason, is not critical as long as it is standardized. For example, a large majority of credit cards in use today use the so-called IMR font. By describing the present invention in connection with that particular font, fundamentals of the invention will be made readily apparent. It is clear however that the invention is applicable to read other fonts such as OCR-A or OCR-B.

Figure 6:
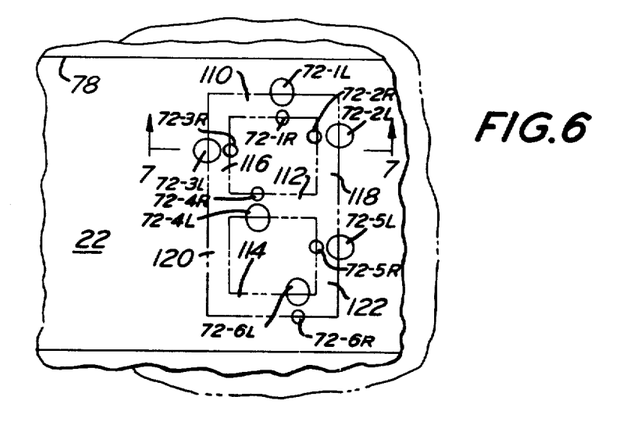
FIG. 6 is an enlarged view of a portion of the read head showing the position of the terminals of the optical fibers for reading numeric indicia.

Referring to FIG. 6, there is shown an enlarged portion of the face of the read head insert 150. Also shown are the end surfaces of the light conducting rods 72. Although it would not normally be observable in a view such as FIG. 6, the numeral "8" has been shown in phantom adjacent to the light conducting rods 72. The numeral eight has been chosen since it contains all of the elements sufficient for constructing all of the numerals ONE, TWO, THREE, FOUR, FIVE, SIX, SEVEN, EIGHT, NINE, ZERO as may be determined by examination of FIG. 10. Thus, the numeral "8" can be broken down into particular elements representative of each of the numerals from "1" through "0". Based on that proposition, it is possible to determine the presence of a particular number by detecting at any particular instance the presence or absence of particular elements of the numeral. From the foregoing, logic circuitry responsive to any detection means can be applied for the purpose of generating information in machine language to be used by a central computer or other memory device.

Analyzing the foregoing, it can be observed that the characters provided for the credit card, passbook, product tag, label, etc. must be in a format that is readable by both human observers and machines. The approach adopted herein, at least for numerals, is to employ a font made up of seven basic segments, elements or bars, three of which are horizontal (top, middle, and bottom) and four of which are vertical (top-left, top-right, bottom-left, and bottom-right). It is to be noted that the basic segments, elements or bars may be straight or curved. For purposes of explanation herein, however, the segments are depicted as being straight.

A character wherein all seven basic bars are present is in the shape of the numeral "8"; that is, an observer inspecting such a character would visually interpret the character as the numeral "8". The numerals "0" through "9" are each made up of unique combinations of the seven bars of the font arranged in the shape of the numeral in question, and are readily identifiable by an observer.

In an electronic character recognition system, the character being scanned can be identified if it is possible to establish which of the seven basic bars are present in the character. Thus, if the scanned character is found to have all seven bars present, it may be concluded properly that the character is the numeral "8". If the scanned character, on the other hand, is found to have all bars present but the middle horizontal bar, it may be concluded properly that the character being scanned is the numeral "0".

Figure 10:
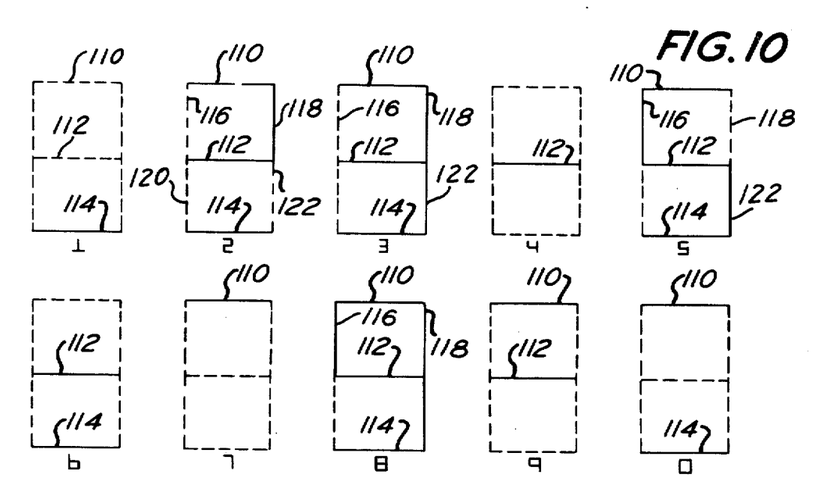
FIG. 10 illustrates a font of type to be read.

Analysis of the font shown in FIG. 10 makes it immediately clear that any one of the numerals one, four, six, seven, nine and zero can be distinguished between themselves by the presence or absence of one of the three horizontal bars 110, 112 and 114. For example, the numeral "1" can be distinguished from the numeral "4" by the presence of the horizontal bar 114 and the absence of the horizontal bars 112 and 110 and which are present in some combination in the numerals "4", "6", "7", "9" and "0". In a like manner, the numeral four can be distinguished by the presence of the horizonal bar 112 which is absent from or appears in combination with other horizontal bars in the numerals one, six, seven, nine and zero. Further analysis shows that the numeral seven requires only the horizontal bar 110 to distinguish it. In a like manner, the numerals six, nine and zero require two of the three horizontal bars to distinguish them.

The detection of the numerals two, three, five and eight requires the use of one or more of the vertical bars which define the numeral "8" because each of these latter numerals includes three horizontal bars. For the purpose of this description, the additional vertical bars are designated 116, 118, 120, and 122. In the IMR 7B font previously mentioned, the vertical bars 118 and 122 for the numeral "1" and the numeral "4" do not coincide with the vertical bars on the numeral "8". However, the detection of vertical bars is not required for recognition of the numerals "1" and "4" as previously described.

Examination of the foregoing, indicates that the numeral "2" can be distinguished from the numerals "3", "5" and "8" by detecting the presence of the three horizontal bars 110, 112 and 114, the presence of the vertical bar 118, and the absence of the vertical bars 116 and 122. In a like manner, the numeral "3" can be distinguished from the numerals "2", "5" and "8" by detecting the presence of the three horizontal bars 110, 112 and 114, the presence of the vertical bars 118 and 122, and the absence of the vertical bar 116. The numeral "5" is distinguished from the numerals "2", "3" and "8" by detecting the presence of the three horizontal bars 110, 112 and 114, the presence of vertical bars 116 and 122, and the absence of vertical bar 118. Finally, the numeral "8" is distinguished from the numerals "2", "3" and "5" by detecting the presence of the three horizontal bars 110, 112 and 114 and the vertical bars 116, 118 and 122.

From the foregoing, it should be obvious that each of the numerals from one through zero can be distinguished from each of the other numerals by detecting the simultaneous presence or absence of one of the six bars 110, 112, 114, 116, 118, and 122.

The numerals one, four, six, seven, nine and zero can be detected by arranging light conducting rods, light sources, and photosensors to determine the presence or absence of the horizontal bars 110, 112, and 114 as each numeral is scanned by the read head insert 150. As shown in FIG. 6, the light conducting rods 72 are arranged in pairs. There are six pairs of light conducting rods indicated by the numerals one, two, three, four, five, and six following the hyphen after the numeral 72. A seventh pair of light conducting rods could be used to detect vertical bar 120, except that for recognizing only numerals, its use is redundant. The particular light conducting rod within any one pair is indicated by either an "L" or an "R". The letter "L" indicates that the light conducting rods is connected to a photosensor and the letter "R" indicates that the light conducting rod is associated with a light source. The pairs of light conducting rods 72-1, 72-4 and 72-6 are used to detect the presence of the horizontal bars 110, 112 and 114 in association with their respective light sources and photocells. The pairs of light conducting rods 72-2, 72-3, and 72-6 are used to detect the presence of vertical bars 116, 118 and 122.

Figure 7:
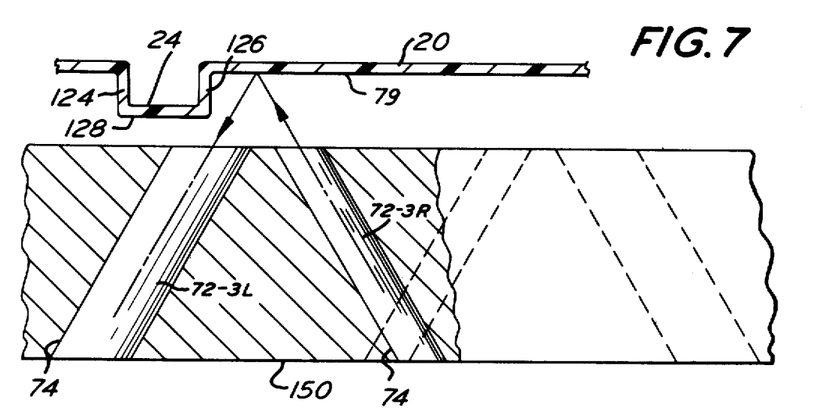
FIG. 7 is a partial sectional view of the read head shown in FIG. 6 taken along the line 7—7.
Figures 8, 9:
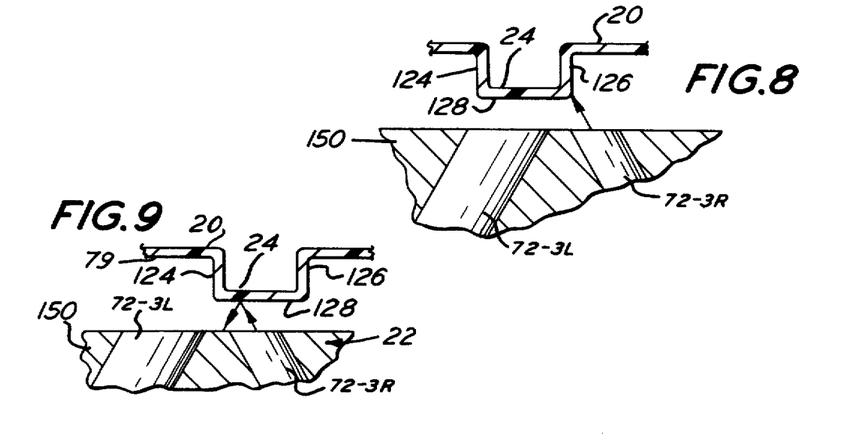
FIG. 8 is a view similar to FIG. 7 showing a different relative position between the read head and the embossed indicia.
FIG. 9 is a view similar to FIGS. 7 and 8 showing a different relative position between the read head and the embossed indicia.

The method for detecting the presence or absence of one of the horizontal bars is best explained by referring to FIGS. 7, 8 and 9. As shown in FIG. 7, the read head insert 150 is scanned over the card 20 on which is embossed a numeral 24. A portion of the numeral 24 is represented by a raised section having side walls 124 and 126 and a top wall 128. Thus, the walls 124, 126 and 128 represent the raised or embossed portion of the numeral 24. The raised portion may be representative of any one of the horizontal or vertical bars. Although the section of the numeral 24 is represented as being rectangular, the principles of the invention, as will be recognized, are equally applicable to numerals which are circular, elliptical, parabolic or otherwise curved in section.

As heretofore indicated, each light conducting rod 72 is inserted in a hole 74 which is at a predetermined angle with respect to the surface of read head 22. In the illustrated embodiment of FIG. 7, the light conducting rods 72-3L and 72-3R are illustrated. However, each of the remaining light conducting rods are positioned at similar angles. The angle chosen for each rod in each pair is preferably equiangular so as to take advantage of the principle that the angle of incidence of electromagnetic radiation is equal to the angle of reflection. The angle of refraction is also provided for. However, such positioning is not absolutely necessary since the principle of the present invention depends in part upon the blocking of the reflection of the light by the raised portion of the numeral 24. Thus, better results may be achieved for embossed numerals having different cross-sectional shapes by positioning the light conducting rods in each pair at differing angles. In an embodiment for detecting embossed numerals, it was found that good results could be obtained by positioning the rods in each pair (rods 72-3L and 72-3R) at angles of approximately 10°-30° with respect to a line normal to the facing surface of the read head insert 150. In another embodiment, reading dark print on a light material, it is necessary to provide a space between the print and the ends of the light conducting rods. This space and the angular relationship of each pair of rods can be determined empirically for best results.

As indicated above, each of the light conducting rods indicated by the letter "R" is associated with the light source positioned at the end of the rod not shown in the drawings. The light from said source is conducted through the rods and emanates from it. It follows a straight line path until it is reflected by the surface of the card 20. In the absence of a projection on the surface of card 20, the light will be reflected therefrom and enter one of the rods ending with the letter "L". In FIG. 7 this is light conducting rod 72-3L. Rod 72-3L and all other rods ending with the letter "L" are slightly larger in diameter than the rod 72-3R and all other rods ending in the letter "R". This is done so as to compensate for attenuation of the light by providing more area for gathering the light. Rods 72-L and 72-R may also be the same diameter. The light reflected from the surface of card 20, as shown in FIG. 7, enters the rod 72-3L and is conducted to a photosensor 132. The photosensor transduces the light into an electric signal which in turn may be converted by logic circuitry into machine language indicative of the presence or absence of a bar. When combined with other logic circuitry and information produced therefrom, the presence or absence of a particular numeral can be determined.

As long as the light emanating from rod 72-3R impinges upon the surface of card 20, it is reflected into light conducting rod 72-3L and detected by the photosensor associated therewith. However, the read head 22 is advancing relative to the card 20. When the read head 22 reaches the position illustrated in FIG. 8, the light conducting rods 72-3R and 72-3L are positioned directly over the upstanding portion of numeral 24 defined by the walls 124, 126 and 128. In this position, and even before it reaches this position, these outstanding walls block the reflection of light into the rod 72-3L. Accordingly, the light reaching the photosensor associated with light conducting rod 72-3L is diminished or even extinguished. This condition continues for an amount of time determined by the rate of scan. As illustrated in FIG. 9, the light emanating from rod 72-3R is reflected from the top wall 128, but since the emanating face of light conducting rod 72-3R is closer to the top wall 128 than it is to the surface of card 20, there is not sufficient distance for the reflected light to separate from the incident light with the result that it impinges only upon a blank portion of the read head 22 rather than upon the surface of the light conducting rod 72-3L. Of course, some light may enter rod 72-3L but it will be measurably diminished.

The foregoing, together with FIGS. 7, 8 and 9, explain the basic process whereby the paired light conducting rods are used to detect the presence or absence from a raised portion of a numeral. Preferably, although not necessarily, the surface of the read head insert 150 should abut the top wall surfaces 128 of the various embossed indicia on the credit card 20 of the like. This assures that the light emanating from rod 72-3R or any of its counterparts is actually blocked from reflection into rod 72-3L or any of its counterparts. Given the foregoing, the depth of guide recess 78 should be slightly more than the maximum height of the numerals 24 embossed on the surface of card 20. The bottom surface 155 of read head insert 150 projects into the recess 78 and hence the embossed characters come into abutment with the read head insert 150.

From the foregoing, it should be apparent that it is possible for any given pair of light conducting rods to detect the presence or absence of a raised portion of the numeral when associated with an appropriate light source and photosensor.

Athough the foregoing process has been described in respect to the reading of embossed characters on a credit card or the like, it should be noted that the technique works equally well for reading characters printed on a flat surface. Thus, the light conducting rods equally read a diminution of light caused by the dark print absorbing rather than reflecting light to a light conducting rod. The guide recess 78 is not necessary for reading flat print. Rather, another form of guide can be utilized so that the print to be read can be brought into alignment with the read head insert 150.

It should be noted that one of the advantages of the present invention is that single light conducting rods may be used in the read head 22. There is no requirement that the rods be used in bundles, as they are usually sold. This results in a substantial reduction in the size of the read head as well as the ability to get good, positive indications of the presence or absence of a portion of a character. The light conducting rods are readily available on the open market. By way of example, but not of limitation, the rods indicated by the final letter "L" may have a diameter of approximately 0.005 to 0.020 inches and the rods indicated by the final letter "R" may have a diameter of approximately 0.005 to 0.020 inches.

Each of the light conducting rods 72-L and 72-R is made of a flexible material (plastic or glass) so that it may be coupled to photosensors 132 (FIG. 11) and light sources (not shown) that are stationarily mounted. Stated otherwise, the light conducting rods permit coupling to the stationary photosensors, light sources, logic circuits and the like which need not be mounted on the read head or its transport mechanism. This means that the weight of the read head insert 150 as well as the entire read head 22 carries a minimum amount of weight and hence has reduced inertia. This facilitates alignment of the read head 22 and read head insert 150 with respect to the characters on the credit card. Thus, the read head can accurately align itself with the characters to be read. Another advantage of using light conducting rods is that they permit the optical reading head to get very much closer to the material being read and still be accurate in reading particular portions of the indicia.

Each pair of rods, as shown, is arranged so that the light is preferably projected from the inside of the numeral toward the outside. This is done so that the rods associated with photosensors in effect pick up only light which emanates from their associated light conducting rods. In the case of light conducting rods 72-4L and 72-4R, the light is projected from top to bottom all within the center bar 112 of the character. Moreover, this pair of light conducting rods is somewhat displaced relative to the 72-6 pair. This has been done to avoid detection by the photosensor associated with light conducting rod 72-6L of stray light emanating from rod 72-4R.

Of course, each of the pairs of light conducting rods operates to detect the presence of a portion of a character in a same manner as described with respect to light conducting rods 72-3L and 72-3R. Accordingly, further illustration and description is deemed not necessary.

As indicated above, the presence or absence of a particular numeral is indicated by the detection of the absence of light by one or more of the photosensors associated with the light conducting rods indicated by a numeral ending in "L". The photosensors, may, at certain times detect combinations of the absence of light other than those described above as being indicative of the numerals one through zero, however, the logic circuitry will reject these and accept only the appropriate combination.

The present invention has been described thus far in terms of detecting a character such as an Arabic numeral, by detecting parts thereof which can be logically translated into machine language. In the embodiment illustrated in FIG. 6, six such detectors used to read the Arabic numerals "1" through "0". The present invention is by no means limited to the use of six detectors. In another embodiment, five detectors can be used.

Figures 2, 3, 12:
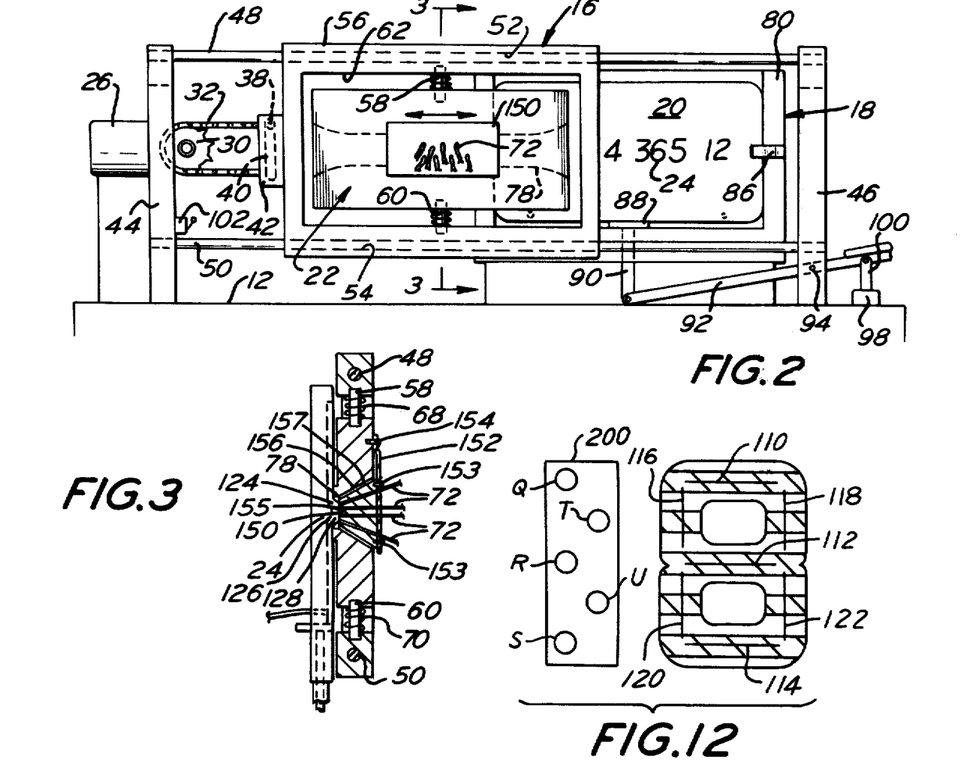
FIG. 2 is a longitudinal sectional view of the device illustrated in FIG. 1 taken along the line 2—2.
FIG. 3 is a transverse sectional view of the device illustrated in FIG. 2 taken along the line 3—3.
FIG. 12 is a schematic diagram of a modified read head.

Referring to FIG. 12, there is shown a read head insert 200 on which there are only five detectors designated Q, R, S, T, and U. For ease of illustration, only the detectors are shown. It is presumed that a source of light will be provided in the manner illustrated in FIGS. 7, 8 and 9. The detectors Q, R, S, T and U represent the end faces of light conducting rods. Each of the light conducting rods is connected to a photosensor.

It may be observed that read head insert 200 includes two sets of horizontally displaced detectors. The first set of detectors comprises the three vertically aligned detectors identified as Q, R, and S establishing what is termed to be Q, R and S channels of the head. The second set of detectors comprises two vertically aligned detectors identified as T and U Establishing what is termed the T and U channels of the head.

Detectors Q, R and S are aligned, respectively, with the top, middle, and bottom horizontal bars of the font being used. This is illustrated in FIG. 12 by the numeral "8" positioned to the right of the read head insert 200. This numeral contains all seven of the basic bars of a font. In particuar, detector Q is aligned with top horizontal bar 110; detector R is aligned with middle horizontal bar 112; and detector S is aligned with the bottom horizontal bar 114. Relative movement between the read head insert 200 and a numeral to be identified will cause the detectors of set Q, R, and S to scan numeral "8" enclosing bars 110, 112 and 114, as shown in FIG. 12.

Detector T is located approximately midway between detectors Q and R; and detector U is located approximately midway between detectors R and S. As a consequence of this arrangement, detectors T and U will scan along the cross-hatched regions of a numeral intercepting bars 116 and 118, and bars 120 and 122, respectively, as indicated in FIG. 12. The horizontal spacing between the two sets of vertically aligned detectors is such that detector T or U will always detect the presence of a vertical bar before detector Q, R or S detects that bar, but detector Q, R or S will detect a leading horizontal bar, as in "1", "3" or "7" before detector T or U detects a vertical bar. Thus, each of the seven bars that make up a numeral "8" can be detected.

Although the character "8" shown in FIG. 12 has vertical side bars, and therefore the Q, R and S detectors are shown as being aligned in one vertical plane and the T and U detectors as being aligned in the second vertical plane, the recognition system will function in the same way if the characters of the font have slanted or sloped side bars instead of vertical ones and the detectors are aligned so that the Q, R and S detectors lie in a first line or plane substantially parallel to the slanted bars of the characters and that the T and U detectors lie on the second line or plane substantially parallel to the slanted side bars of the characters to be read. Hence, while reference herein is made to vertical bars as a specific example to aid understanding, the term vertical bars is not intended to be limiting and is meant to include bars which are slanted or sloped as well.

Whenever no bar of a character is opposite to a detector, the amplitude of the signal in the channel associated with the detector will have a first voltage level. When a bar of a character is opposite a detector, the signal level in the channel will be different as explained with reference to FIGS. 7, 8 and 9. The signal level at any instance in an electronic channel associated with a detector is therefore an indication of whether the bar of the character being scanned is opposite the detector at that instant. If a bar is opposite, this situation is termed "an event". The present invention may utilize a dynamic scanning system in which a predetermined sequence of events in the various channels is utilized to establish which of the seven basic bars of the font is present in the character being scanned, and to indicate, when, during the scanning process, sufficient information is available to be assured that the character being scanned can be properly identified. Given the foregoing, it then appears that certain logical rules regarding the sequence of events can be determined. Applying these logical rules and developing electronic circuitry permits the numeric characters "1" through "0" to be read.

Thus, both the five and six detector read head insert has been described. More or less detectors may be desirable for reading other types of characters. However, the same principles would be applied; namely, a set of detectors would be appropriately positioned to read a portion of each character as it is scanned and this information thereafter logically processed into machine language. A read head having seven sets of detectors enabling it to read bar 120 may be desirable. Also, the position of the detectors in the read head insert as shown in FIGS. 6 and 12 may be varied. For example, all of the detectors in FIG. 12 could be aligned in a straight line in appropriate circumstances.

It should be mentioned that in addition to detecting the numerals one through zero, it is also possible to detect the space between each numeral. This is accomplished by providing logic circuitry which responds to the total absence of the horizontal bars 110, 112 and 114, one of which is present in every numeral one through zero. The detection of spaces provides a system control not dependent upon time; that is, reading a space provides a means for logically separating one character from the other. This means that the characters need not be accurately spaced apart. It also reduces the possibility of error due to free light being inadvertently picked up in a combination which would indicate the presence of a numeral that is not in fact present. By including the logic requirement that the detection of each numeral must be followed by detection of a space, the system has a means for distinguishing between a number properly detected and one inadvertently detected due to mechanical and physical imperfection. Another advantage of a system that is independent of time or velocity of the scan is that the transport mechanism 18 could be eliminated and the read head support mechanism 16 translated by hand. The detection of a space applies to the reading of both embossed ad printed flat characters.

Another feature of the invention is that the electronic logic circuitry can provide a means for requiring that a detected space or valid numeral remain detected for an interval of time sufficient to differentiate between very short spurious but possibly correct combinations of signals caused by electrical noise or noncoincidence of signals from vertical bars 116, 118 and 122. The length of time that a valid numeral or space usually stays detected is longer than spurious signals. Another feature of the invention is that it allows electronic logic circuitry to provide a means for determining that a valid numeral has not been properly read between two consecutive spaces. In the event this happens a signal, such as a binary "12", is generated. If desirable, this can activate circuitry which causes an automatic rescanning operation to take place at least once.

One of the advantages of the method of detecting embossed characters as described above is that it need not be dependent upon the reflective qualities of the card 20 or the characters 24. For example, the ink or other coloring material on a credit card may have become erased or at least be missing from a portion of a letter. Thus, it is possible for other optical reading systems to miss a letter if they depend upon differences between light and dark on the surface itself. The present invention takes advantage of the embossed letters which will not vary in structure except if the card is unusually physically abused.

From the foregoing, it should be apparent that there has been provided an apparatus 10 which scans the read head 22 relative to the card 20 and sequentially detects the indicia embossed on the card 20. In the embodiment described, the indicia consists of the Arabic numbering system from zero through nine. However, the system is equally adaptable to other forms of indicia such as the letters of the alphabet. Each indicia is detected by determining the presence or absence of a raised portion thereof in combination with other raised portions. Those skilled in the art will readily perceive that while the invention was described with respect to detecting embossed indicia, it is equally applicable to detecting debossed indicia since either condition will interfere with the reflection of light from the surface of card 20 or its equivalent.

Referring now to FIG. 11 there is shown a schematic block diagram of circuitry which may be used with each apparatus 10 when said apparatus forms one of a plurality of remote terminals connected to a central memory bank. As shown, the apparatus includes a control circuit 130 for the motor 26 which includes the light conducting rods 106 and 108, photosensors 151 and 160 associated with said light conducting rods and control circuitry for causing the motor to drive the read head support mechanism through the reciprocatory functions described above. Since such control circuitry is conventional, it will not be described in detail. Moreover, power sources for the control circuitry 130 and for the rest of the circuitry described and shown in FIG. 11 has not been illustrated since power supplies and the like are equally well known to those skilled in the art.

As shown, each of the six light conducting rods 72-L is positioned in appropriate juxtaposition with respect to one of six photosensors 132 which detect the light or other electromagnetic radiation conducted through said light conducting rods and generate an appropriate electronic signal either in the form of a change of current or change of voltage. This electronic signal, as explained above, is representative of the presence or absence of a portion of a letter.

The electronic signal generated by the photosensors 132 is amplified by amplifiers 134 and applied to appropriate detecting circuitry 136. The detectors 136 include appropriate clamping circuitry and the like for detecting an electrical signal of the appropriate level.

The signal from the detectors 136 is next applied to decoder and encoder circuitry 138 which performs several functions. The first function of the decoder and encoder 138 is to process the signals received from the detectors through logic circuitry which determines the particular number so received. The second function of the decoder and encoder 138 is to detect the spaces between the numbers and separate them from the numbers themselves. Finally, the decoder and encoder encodes both the numbers and the spaces into a binary form for further processing by the system.

Circuitry for performing the function of the decoder and encoder 138 is known to those skilled in the art. Hence, it need not be described in detail. Indeed, it is sufficient to describe such circuitry as a 6X11 decoder together with a binary encoder. However, it should be pointed out that in copending application Ser. No. 229,922, filed Feb. 28, 1972, now abandoned in favor of continuation application Ser. No. 445,706 filed Feb. 25, 1974 and now U.S. Pat. No. 3, there is described a particular logic circuit invented for use with the present invention.

The circuitry 138 has two outputs. Each binary number is transferred to a parellel-in, serial-out shift register 140 which performs the conventional function of a shift register in that it temporarily stores binary coded decimal numbers. Each space is converted to a binary signal by the circuit 138 and transferred to the clock circuit 142. In operation, the decoder and encoder 138 is responding to the relative movement of the read head 22 with respect to the card 20. Thus, it would first generate a space which is decoded, separated, encoded and sent to the clock circuit; then a number is decoded, encoded and entered in the shift register 140; and then another space and then another number are similarly operated upon.

From the foregoing, it should be apparent that detecting a space controls the mode of the shift register 140. This is so because the circuitry of the shift register 140 is such that each time a space is sent to the clock circuit 142, or more properly, the end of a space, it changes its mode so as to prepare to enter a number in parallel. When the shift register 140 detects the beginning of a space, it again shifts its mode so as to serially clock out data stored therein. The shifting function from mode to mode is controlled by the clock circuit 142 in the conventional manner. In other words, the clock circuit 142 operates to control the shift register 140 in a manner determined by the spaces delivered to it by the circuit 138.

The clock circuit 142 is connected to memory 144 which may be described as the main memory for the terminal apparatus 10. The memory 144 may be a fifty bit memory such as is well known and available on the open market. The purpose of connecting clock circuit 142 to memory 144 is to permit the clock circuit to control the memory 144 to indicate when it should accept the serial output of shift register 140. The memory 144 serves to store the indicia until such time as it can be transmitted to an appropriate central memory bank through appropriate interfacing circuitry.

Finally, a disabling circuit 146 is connected to the decoder and encoder 138 for disabling the circuit during the return stroke of the reciprocating read head 22. Thus, numbers are read only in one scanning direction of the read head 22.

It has been indicated throughout this disclosure that both embossed indicia and flat printed indicia can be read. It has been found that the read head 22 has the ability to not only read well defined flat printed characters but also flat printed characters that are in poor condition from an optical point of view. It has been found that the read head 22 will accurately detect printed characters even though they have been written over or partially obliterated. It is believed that this is because the technique used does not depend upon an overall view but rather upon the detection of parts of a character followed by the logical assembly of such detected parts to determine its presence.

A read head for reading flat print preferably would not include the guide groove 78. Rather, the read head would be guided on the edge of the paper or other material supporting the flat print. For example, if the read head was being used as a tag reader, it could be guided by the edge of the tag affixed to the product. Such edge guiding of the tag reader permits the light conducting rods to be brought into alignment with the print. A reader for reading flat print could otherwise be combined with logic circuitry such as illustrated in FIG. 11.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for reading a font of indicia carried by a substantially planar substrate and displaced from the plane thereof, comprising a plurality of sets of detector means in spaced relation from said substrate, each of said sets comprising a light source and a light sensor, said light source and said light sensor in each set being on an angle with respect to said substrate so that light from said source will be reflected from the plane of said substrate to said sensor, said light sensor being positioned with respect to said light source to detect light reflected from the plane of said substrate and at least a reduction in the amount of reflected light due to the presence of at least a part of the indicia of said font which impedes the reflection of light to said detector, means associated with said light sensors for generating a signal having informational value indicative of the indicia detected, and each of said sets of light conducting means being positioned to sense the presence of a different portion of said font.

2. Apparatus as defined in claim 1, including means for supporting said sets of detector means, support means for supporting said substrate, and means for moving said substrate and said set of detector means relative to each other so that said detector means scan said font.

3. Apparatus as defined in claim 1, including a read head, means for moving said read head relative to said substrate so that said font is scanned thereby, means on said read head for supporting said plurality of sets of detector means, and each of said detector means comprising a light conducting rod.

4. Apparatus as defined in claim 1 wherein said light source and said light sensor in each of said sets have longitudinal axes, and said axes are at a bias relative to a line normal to the plane of said substrate.

5. Apparatus for reading a font of embossed indicia on the surface of a credit card, comprising means for detecting the presence of selected portions of said indicia, said means comprising a plurality of sets of light sources and light sensors, a read head, said read head supporting each of said light sources in each of said sets so that it directs a beam of light toward said surface at an angle, means for causing relative movement between said read head and said credit card so that said selected portions of said indicia will intercept said beams of light, said read head supporting each of said light sensors at an angular position to detect reflected light so that they normally intercept beams of light reflected from said surface and at least a reduction in the amount of reflected light due to the presence of at least a part of the indicia of said font which impedes the reflection of light to said detector, and means associated with said sensors for generating a signal having informational value indicative of the indicia detected.

6. Optical reading apparatus for reading a font of indicia supported on a substrate, the indicia of said font having at least a portion thereof displaced from the surface of the substrate comprising, a read head, a plurality of light conducting means having terminal faces, one of said terminal faces of each of said light conducting means being supported by said read head in a position to intercept light reflected from the surface of said substrate along a path which is at an angle from a normal relative to said substrate, said terminal faces being operative to detect the presence of predetermined areas of said indicia related to the basic configuration of said font, means for moving said indicia and said read head relative to each other, said terminal faces being positioned so that movement of said indicia and said read head relative to each other causes said predetermined areas to occlude the light reflected along said path into said terminal faces of said light conducting means.

7. Apparatus for identifying characters of a font embossed in a substrate, comprising a plurality of means for directing light to be incident upon said substrate at a first predetermined angle, a plurality of means each disposed at a second predetermined angle to said substrate for receiving light reflected from said substrate, each said light directing means and light receiving means being positioned such that light directed onto the surface of said substrate where it is not embossed is reflected to said light receiving means whereas light impinging upon any of said indicia is at least in part blocked and thus not reflected to said light receiving means, each said light directing means and light receiving means being positioned in a read head to sense the presence of different segments of the characters of a font.

8. In an apparatus for identifying embossed characters, a read head, means for scanning said read head relative to said characters, and guide means for guiding said read head into proper alignment with said characters by physically engaging and guiding on the raised segments of said embossed characters.

9. In an apparatus for identifying embossed characters in accordance with claim 8 wherein said guide means comprises an elongated guide slot open at either end and at the top thereof.

10. In an apparatus for identifying embossed characters in accordance with claim 8 wherein said guide means comprises an elongated slot integral with said read head, said slot being open at either end and the top thereof.

11. In an apparatus for identifying embossed characters in accordance with claim 8 including means to support said read head for movement into alignment with said embossed characters.

12. In an apparatus for identifying embossed characters in accordance with claim 11 wherein said support means includes means to permit said read head to move in a plane parallel to said embossed characters and means to permit said read head to move toward or away from a substrate supporting said embossed characters.

13. In an apparatus for identifying embossed characters, a read head, said read head supporting a plurality of sets of detector means for detecting the presence or absence of segments of said characters, means for scanning said read head relative to said characters, and guide means for guiding said read head into proper alignment with said characters by physically engaging and guiding on the raised portions of said embossed characters, said guide means comprising an elongated guide slot.

14. Apparatus for identifying embossed characters of a font having top, middle and bottom horizontal segments, and upper and lower right and left vertical segments, comprising a read head having at least five sets of detector means for detecting the presence of said segments, at least two of said sets being positioned to detect the vertical segments and at least three of said sets being positioned to detect the horizontal segments, each set of detectors having a light source positioned to direct light toward the segments of the characters to be read and having a light sensor positioned to detect reflected light, means for moving said read head and the characters to be read relative to each other, means responsive to the output of said light sensors for indicating the identity of said characters, means for scanning said read head relative to said characters, and guide means for guiding read head into proper alignment with said characters by physically engaging and guiding on the raised segments of said embossed characters.

15. In an apparatus for identifying embossed characters in accordance with claim 14 wherein said guide means comprises an elongated slot open at either end and at the top thereof.

16. In a device for "reading" embossments on a card, scanning means for scanning the embossments, and positioning means for engaging the embossments themselves for accurately positioning the embossments with respect to said scanning means to be scanned thereby.

17. The combination of claim 16 and wherein said positioning means includes an elongated guide formed with an elongated guide slot which is open at one end, said slot being defined between longitudinal edges of said positioning means which directly engage a row of embossments for accurately positioning the latter in said slot between said longitudinal edges thereof, said scanning means being located directly next to said positioning means substantially bridging said slot thereof for scanning the embossments positioned between said edges.

18. The combination of claim 17 and wherein said guide has an inwardly tapering portion at said open end of said slot for facilitating entry of the embossments between the longitudinal side edges of said slot.

19. The combination of claim 16 and wherein said positioning means includes a positioning lip forming part of the scanning means itself for directly engaging an embossment for keying the embossment and scanning means directly to each other.

20. The combination of claim 19 and wherein there are a pair of said lips extending parallel to each other to define between themselves an elongated space for receiving a series of embossments with the lips engaging opposed portions of said embossments for keying the scanning means and embossments which are to be scanned thereby directly to each other.

21. Apparatus for machine reading characters of a font having upper, middle and lower horizontal segments and upper and lower vertical segments borne by a substrate, comprising:
  an optical read head having a front face positionable in confronting relation to a substrate bearing said characters to be read;
  said read head incorporating spaced, individual upper, middle and lower horizontal character segment detecting means and upper and lower vertical character segment detecting means such disposed to detect light reflected from said substrate at a given angle of reflection,
  a source of illumination for providing said light,
  at least one aperture in said front face of said read head serving to direct light from said source to said substrate, and
  guide means for maintaining the read head in proper alignment with said characters during relative movement between said substrate and read head in the direction of said horizontal segments to cause said detecting means to scan a character on the substrate and yield signals indicative of the presence and absence of said segments in the character being scanned.

22. Apparatus in accordance with claim 21 wherein said characters are embossed, and guide means include means for engaging said embossed characters to guide said read head into alignment for identifying said characters.

23. Apparatus in accordance with claim 22 wherein said engaging means is an elongated recess in the surface of said read head, the longitudinal axis of said recess extending in the direction in which said read head is moved relative to said characters.

24. Apparatus in accordance with claim 22 wherein said read head is supported by support means, said support means including means permitting said read head to be displaced parallel to the plane of said characters and toward or away from said characters by engagement of said engaging means with said characters.

25. Apparatus in accordance with claim 21 wherein each said individual detecting means is arranged in a set comprising a light sensor and a light directing aperture, a light conduting rod optically associated with said light source positioned in each aperture, and a second light conducting rod optically associated with each light sensor for conducting reflected light from said read head to the sensor.

26. Apparatus in accordance wih claim 25 wherein each of said light conducting rods is flexible, said apparatus including means for moving said read head and the character to be read relative to each other, said moving means including means for moving said read head relative to characters fixed in position on said substrate, said light source and light sensor associated with each light conducting rod being fixed in position.

27. Apparatus in accordance with claim 21 wherein said characters are numerals defined by seven horizontal and vertical segments, and said reading head consists of five sets of detecting means for detecting the presence of said segments.

28. Apparatus for machine reading characters of a font having upper, middle and lower horizontal segments and upper and lower vertical segments borne by a substrate, comprising:
an optical read head having a front face positionable in confronting relation to a substrate bearing said characters to be read,
said read head incorporating at least five spaced, individual sets of characters segment detecting means for detecting the presence of said segments of characters of a font,
at least two of said sets of detecting means being positioned to detect the vertical segments and at least three of said sets of detecting means being positioned to detect the horizontal segments,
each set of detector means having a means for directing light at an angle toward the substrate bearing the segments of the character to be read and having a light sensor means positioned to detect reflected light from said substrate at a given angle of reflection,
means for positioning the front face of said read head in confronting relation to a substrate so that the presence of segments of a character at least partially occludes the reflection of light to a sensor, and
guide means for maintaing the read head in proper alignment with said characters during relative movement between said substrate and read head in the direction of said horizontal segments to cause said sets of detecting means to scan a character on the substrate and yield signals indicative of the presence or absence of said segments in the character being scanned.

29. Apparatus in accordance with claim 28 wherein said characters are embossed in said substrate, and said apparatus includes positioning means, said positioning means being adapted to position the read head so closely adjacent said embossed characters that the segments of said characters at least partially physically block the reflection of light to said light sensors.

30. Apparatus for machine reading characters of a font having upper, middle and lower horizontal segments and upper and lower vertical segments borne by a substrate, comprising:
an optical read head having a front face positionable in confronting relation to a substrate bearing said characters to be read,
said read head incorporating spaced, individual upper, middle and lower horizontal character segment detecting means and upper and lower vertical character segment detecting means such disposed to detect light reflected from said substrate at a given angle of reflection,
said read head including a lesser number of segment detecting means than there are horizontal and vertical segments defining the characters of the font,
a source of illumination for providing said light,
at least one aperture in said front face of said read head serving to direct light from said source to said substrate, and
means for producing relative movement between said substrate and read head in the direction of said horizontal segments to cause said detecting means to scan a character on the substrate and yield signals indicative of the presence or absence of said segments in the character being scanned.

31. Apparatus in accordance with claim 30 wherein said characters are embossed, and including means for positioning said read head so closely adjacent to said embossed characters that the segments of said characters at least partially physically block the reflection of light to said detecting means.

32. Apparatus for machine reading characters of a font of numerals defined by seven embossed segments comprising upper, middle and lower horizontal segments, and upper and lower right and left vertical segments borne by a substrate, comprising:
an optical read head having a front face positionable in confronting relation to a substrate bearing said characters to be read,
said read head incorporating at least five spaced, individual sets of upper, middle and lower horizontal character segment detecting means and upper and lower vertical character segment detecting means such disposed to detect light reflected from said substrate at a given angle of reflection,
at least two of said sets being positioned to detect the vertical segments and at least three of said sets being positioned to detect the horizontal segments,
each set of detecting means having means for directing light at an angle toward the substrate and having light sensor means positioned to detect light reflected from the substrate at a given angle of reflection,
guide means for maintaining the reading head in proper alignment with said characters during relative movement between said substrate and read head in the direction of said horizontal segments to cause said sets of detecting means to scan a character on the substrate to yield electrical signals indicative of the presence or absence of said segments in the character being scanned, and
means positioning said read head so closely adjacent the characters that the segments thereof at least partially occlude the reflection of light to said light sensor means while said segments are scanned.

33. A method of machine reading characters of a font having upper, middle and lower horizontal segments and upper and lower vertical segments borne by a substrate, comprising:

presenting said substrate in confronting relation to the front face of a read head which incorporates spaced, individual upper, middle and lower horizontal character segment detecting means and upper and lower vertical character segment detecting means such disposed to detect light reflecting from said substrate at a given angle of reflection, illuminating said substrate through at least one aperture in the front face of said read head disposed to direct light upon said substrate at an angle such as to provide reflection at said given angle, and producing relative movement between said substrate and read head in such a direction as to cause said individual detecting means to scan for corresponding segments of a character borne by the substrate to yield signals indicative of the presence or absence of such segments in the character being read.

34. A method of identifying characters of a font in accordance with claim 33, wherein said characters are embossed, detecting the presence of said segments by directing light at an angle toward the segments of the characters to be read and detecting reflected light reflected, guiding said read head into engagement with said embossed characters for alignment therewith, and using the segments of said characters to physically block the reflection of light to a light sensor positioned to detect reflected light.

35. A method of machine reading characters of a font borne by a substrate said characters being defined by seven segments comprising top, middle and bottom horizontal segments, and upper and lower left and right vertical segments, comprising the steps of:

presenting said substrate in confronting relation to the front face of a read head which incorporates spaced, individual, upper, middle and lower horizontal character segment detecting means and upper and lower vertical character segment detecting means such disposed to detect light reflected from said substrate at a given angle of reflection, scanning the characters with said read head and illuminating said substrate through at least one aperture in the front face of said read head as said characters are being scanned, directing the illuminating light upon said substrate at an angle such as to provide reflection at said given angle, guiding said substrate and read head past each other in such a direction as to cause said individual detecting means to scan corresponding segments of the substrate bearing the characters to yield signals indicative of the presence or absence of such segments in the character being read by using certain of said detecting means to scan for the presence of horizontal segments of said characters and using certain others of said detecting means to scan for the presence of vertical segments of said characters, and using said detecting means to logically separate one character from another by detecting the space between said characters as defined by the absence of any vertical or horizontal segments.

36. Apparatus for machine reading characters of a font having upper, middle and lower horizontal segments and upper and lower vertical segments embossed in a substrate, comprising:

an optical read head having a front face positionable in confronting relation to a substrate bearing said characters to be read, said read head incorporating spaced, individual upper, middle and lower horizontal character segment detecting means and upper and lower vertical character segment detecting means such disposed to detect light reflected from the plane of said substrate at a given angle of reflection, a source of illumination for providing said light, guide means for positioning and maintaining the read head in proper alignment with the embossed characters during relative movement between said substrate and read head such that said read head is so closely adjacent to said embossed characters that the embossed segments of said characters at least partially occlude the reflection of light to said character segment detecting means whereby said detecting means scans a character on the substrate and yields signals indicative of the presence or absence of said embossed segments in each character being scanned.

* * * * *